US008893100B2

(12) United States Patent
Lovett et al.

(10) Patent No.: US 8,893,100 B2
(45) Date of Patent: Nov. 18, 2014

(54) RETURN ADDRESS OPTIMISATION FOR A DYNAMIC CODE TRANSLATOR

(75) Inventors: William O. Lovett, Manchester (GB); Alexander B. Brown, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 13/479,026

(22) Filed: May 23, 2012

(65) Prior Publication Data

US 2013/0024675 A1 Jan. 24, 2013

Related U.S. Application Data

(63) Continuation of application No. 13/186,831, filed on Jul. 20, 2011, now abandoned.

(51) Int. Cl.
| | | |
|---|---|---|
| G06F 9/45 | (2006.01) | |
| G06F 9/32 | (2006.01) | |
| G06F 9/38 | (2006.01) | |
| G06F 9/455 | (2006.01) | |
| G06F 9/30 | (2006.01) | |
| G06F 9/44 | (2006.01) | |

(52) U.S. Cl.
CPC ............... *G06F 9/322* (2013.01); *G06F 9/443* (2013.01); *G06F 9/3806* (2013.01); *G06F 9/455* (2013.01); *G06F 9/30054* (2013.01)
USPC ...................................................... 717/153

(58) Field of Classification Search
CPC ..................................................... G06F 8/443
USPC ...................................................... 717/153
See application file for complete search history.

(56) References Cited

U.S. PATENT DOCUMENTS

| 6,205,545 | B1 * | 3/2001 | Shah et al. ..................... 712/237 |
| 7,203,933 | B2 | 4/2007 | Souloglou et al. |

(Continued)

FOREIGN PATENT DOCUMENTS

CN 101452395 6/2009

OTHER PUBLICATIONS

Rogers, Ian, "Optimising JAVA Programs Through Basic Block Dynamic Compilation," University of Manchester, chapter 3, pp. 45-60 (Sep. 2002).

Tingtao, Sun, et al., "Return Instruction Analysis and Optimization in Dynamic Binary Translation," Int'l. Conf. Frontier of Computer Science and Technology (2009).

(Continued)

*Primary Examiner* — Wei Zhen
*Assistant Examiner* — Lanny Ung
(74) *Attorney, Agent, or Firm* — John D. Flynn; Jack V. Musgrove (57) ABSTRACT

A dynamic code translator with isoblocking uses a return trampoline having branch instructions conditioned on different isostates to optimize return address translation, by allowing the hardware to predict that the address of a future return will be the address of trampoline. An IP relative call is inserted into translated code to write the trampoline address to a target link register and a target return address stack used by the native machine to predict return addresses. If a computed subject return address matches a subject return address register value, the current isostate of the isoblock is written to an isostate register. The isostate value in the isostate register is then used to select the branch instruction in the trampoline for the true subject return address. Sufficient code area in the trampoline instruction set can be reserved for a number of compare/branch pairs which is equal to the number of available isostates.

21 Claims, 5 Drawing Sheets

(56) References Cited

U.S. PATENT DOCUMENTS

| | | | |
|---|---|---|---|
| 7,350,062 B2 | 3/2008 | Ukai et al. | |
| 7,478,228 B2 | 1/2009 | Stempel et al. | |
| 7,631,172 B2 | 12/2009 | Henry et al. | |
| 7,805,710 B2 | 9/2010 | North | |
| 8,276,132 B1 * | 9/2012 | Vanderspek et al. | 717/149 |
| 2002/0066081 A1 * | 5/2002 | Duesterwald et al. | 717/128 |
| 2005/0216701 A1 * | 9/2005 | Taylor | 712/34 |
| 2006/0206880 A1 * | 9/2006 | Barraclough et al. | 717/140 |
| 2009/0254709 A1 | 10/2009 | Agesen | |

OTHER PUBLICATIONS

Zahran, Mohamed, et al., "Return-Address Prediction in Speculative Multithreaded Environments," Proc. 9th Int'l. Conf. High Performance Computing (2002).

Bruening, Derek, et al., "An Infrastructure for Adaptive Dynamic Optimization", 2003, pp. 1-11.

Payer, Mathias, et al., "Fine-Grained User-Space Security Through Virtualization", Mar. 9-11, 2011, pp. 157-168.

Zhang, Weifeng, et al., An Event-Driven Multithreaded Dynamic Optimization Framework, 2005, pp. 1-12.

* cited by examiner

RETURN ADDRESS OPTIMISATION FOR A DYNAMIC CODE TRANSLATOR

CROSS-REFERENCE TO RELATED APPLICATION

This application is a continuation of copending U.S. patent application Ser. No. 13/186,831 filed Jul. 20, 2011.

BACKGROUND OF THE INVENTION

1. Field of the Invention

The present invention generally relates to computer systems and emulation, and more particularly to dynamic binary translators which use isoblocks to cache translated code.

2. Description of the Related Art

It is often useful to run a computer program designed for one computer system having a particular processor architecture and operating system (OS) on another computer system having a different processor architecture and/or OS. For example, it is desirable to allow new computer systems to run legacy programs without having to redesign those programs. It takes a significant amount of time (and thus cost) to port an older software application to a new platform. If there is a change in the hardware instruction set, then the application must be recompiled. If there is a change in the OS, then applications must be rewritten to use the new OS calls. Significant changes could be required in the source code just to get the application to do what it did before, without adding any new functionality. In many cases, the cost to port an application may be as much as 40% of the original development cost. If the application was obtained from an outside vendor then, even if the source is available, the understanding of the application's architecture and logic are not necessarily available to the programmers who will be porting the application. If the source for the original application was lost, then porting is not even possible. Reverse engineering or starting development from scratch are also expensive alternatives.

Computer emulation provides a means for a native (target) computer system to execute programs designed for otherwise incompatible systems. An emulator is hardware and/or software that duplicates the functions of the original (subject) computer system in the target computer system, so that the behavior of the target system closely resembles the behavior of the subject system. One method of computer emulation known as binary translation takes a sequence of executable code (a set of binary instructions) from the subject environment and translates it into a sequence of executable code adapted for the target environment. The code sequence may be a basic block, i.e., a portion of the code with certain desirable properties that make it highly amenable to analysis. Compilers usually decompose programs into their basic blocks as a first step in the analysis process. Basic blocks form the vertices or nodes in a control flow graph. The code in a basic block typically has one entry point, meaning no code within it is the destination of a jump instruction anywhere in the program, and one exit point, meaning only the last instruction can cause the program to begin executing code in a different basic block. Under these circumstances, whenever the first instruction in a basic block is executed, the rest of the instructions are necessarily executed exactly once, in order.

SUMMARY OF THE INVENTION

The present invention relates to a method of optimizing return address translation in a dynamic code translator, by receiving a function call from subject code designed for a first machine having a first hardware environment, compiling an isoblock including at least target code and compatibility information wherein the target code is designed for a second machine having a second hardware environment which is different from the first hardware environment and the target code includes a subfunction corresponding to the function call, planting in the target code a trampoline instruction set having a plurality of branch instructions which return a true subject return address conditioned on an isostate of the isoblock stored in an isostate register, and inserting in the target code instructions which write an address of the trampoline instruction set to a target return address stack of the second machine, instructions which write an address from the subject code directly following the function call to a subject return address register, and instructions which write the isostate of the isoblock to the isostate register when a computed subject return address matches an entry in the subject return address register. The instructions which write the address of the trampoline instruction set to the target return address stack include an IP relative target call that also writes the address of the trampoline instruction set to a target link register, and instructions are further inserted which save an existing target return address from the target link register and an existing subject return address from a subject return address register in a translator return address stack, prior to writing the address of the trampoline instruction set to the target link register. The isostate register can be a non-fix-mapped target register. Sufficient code area in the trampoline instruction set can be reserved for a number of compare/branch pairs which is equal to the number of available isostates. The trampoline instruction set can include recovery code to find a successor block if the isostate in the isostate register does not match an isostate for any of the branch instructions.

The above as well as additional features and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Dynamic code translation, also referred to as dynamic binary translation (DBT), is a form of binary translation which takes place in real-time, that is, as an application is executing on the target machine. DBT translates a basic block and caches the resulting sequence. Code is only translated as it is discovered and when possible, and branch instructions are made to point to already translated and saved code (memoization). DBT differs from simple emulation by eliminating the emulator's main read-decode-execute loop (a major performance bottleneck), but incurs large overhead during translation time. This overhead is hopefully amortized as translated code sequences are executed multiple times during continued program execution. QuickTransit was a cross-platform virtualization program developed by Transitive Corp. which utilized DBT. It allowed software compiled for one specific processor and operating system combination to be executed on a different system architecture without requiring changes to source code or binary code. QuickTransit was an extension of the Dynamite technology developed at the University of Manchester. One QuickTransit combination currently available is the PowerVM product from International Business Machines Corp. That product is a virtualization platform for UNIX, Linux and IBM i clients, and thus allows information technology professionals to reduce IT costs by consolidating diverse workloads onto a single platform.

Figure 1:
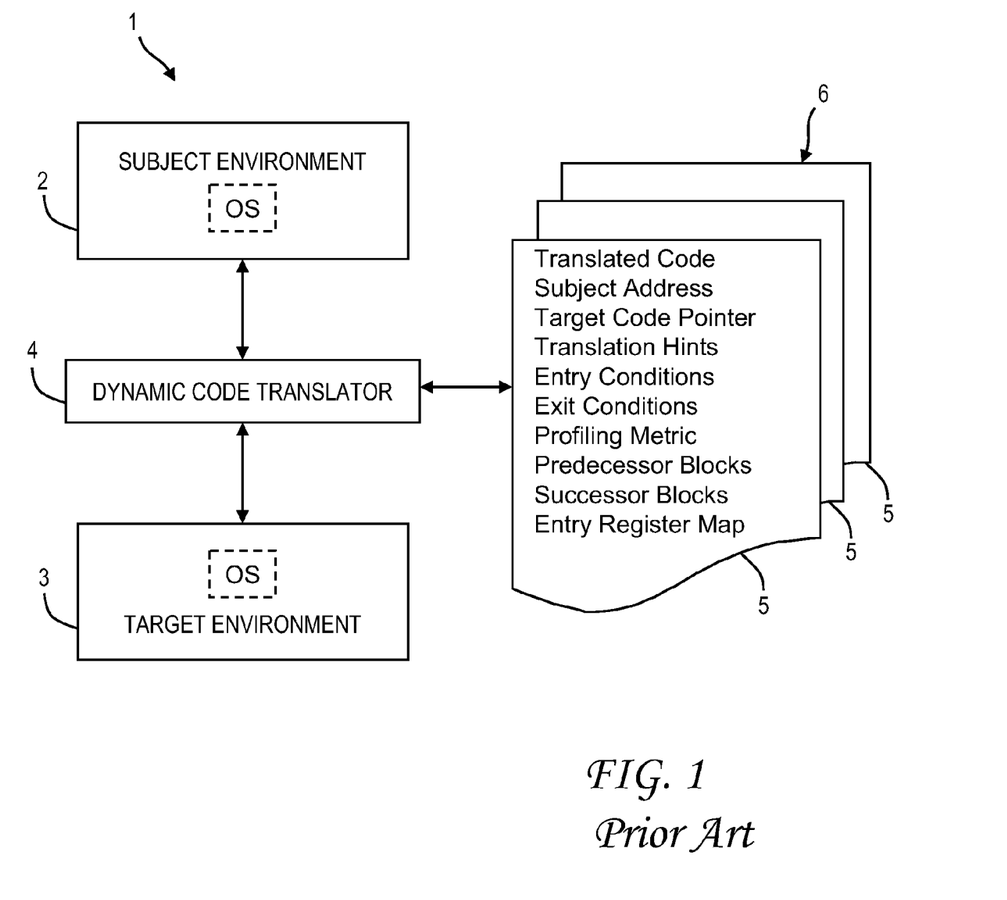
FIG. 1 is a block diagram of a conventional dynamic code translation system which uses isoblocks stored in a cache.

A simplified version of dynamic code translation is illustrated in FIG. 1. The emulation system includes a subject environment 2 which may or may not have its own OS, a target environment 3 which also may or may not have its own OS, and the dynamic code translator 4 which acts as a communications agent between the two environments. Based on the presence of operating systems for the subject and target environments, the translator may be configured as "above", "below", or "in-between" operating systems. Other configurations are possible depending upon the hardware systems involved.

In carrying out the translation, dynamic code translator 4 uses a plurality of isoblocks 5 which are stored in a software cache 6. An isoblock is a basic block with additional compatibility information. The compatibility information is different for each subject architecture to take into account different architectural features. An isoblock can include translated code, a subject address, a target code pointer, translation hints, entry conditions, exit conditions, a profiling metric, a list of predecessor blocks, a list of successor blocks, and an entry register map. If execution reaches a basic block which has already been translated but the previous translation's entry conditions differ from the current working conditions (i.e., the exit conditions of the previous block), then the basic block must be translated again based on the current working conditions. The result is that the same subject code basic block can be represented by multiple target code translations (isoblocks).

One problem that can arise with DBT using isoblocking technology relates to the address of a return from a function call. In computer programming, a return statement causes execution to leave the current subroutine and resume at the point in the code immediately after where the subroutine was called, known as its return address. The return address is usually saved on the process's call stack as part of the operation of making the subroutine call. Modern CPU architectures contain hardware that is very effective at predicting the addresses of returns from function calls, making execution of these returns very efficient. For example, on a modern POWER architecture during the call the hardware pushes the address to be returned to onto a hardware stack (last-in, first-out). This address will be the address of the instruction immediately following the call. When a return is encountered, the hardware pops the top entry off this stack, and predicts this value will be the address to be returned to.

A core assumption of this hardware mechanism is that there is a single address to be returned to, and that this address is usually the instruction directly after the call. When dynamically translating a subject program using DBT with isoblocking technology, these assumptions are no longer valid. There is no assurance that the subject program will not have modified its record of the return address, so it is possible that the return should go to a different location than expected. Furthermore, with isoblocking, there are likely to be multiple different translations of the subject address to be returned to as explained above. Even if the hardware could be sure of the correct return address, there might be multiple blocks that start with that address. This latter issue prevents a naive translator from constructing an emulation of a subject call-return stack, since the required information is only known at runtime, very close to the point where it is used, effectively creating an indirect branch. It is very difficult for target hardware to effectively predict the addresses of indirect branches, and not surprisingly such a solution can perform very poorly.

In light of the foregoing, it would be desirable to devise an improved method of dynamic code translation which could more efficiently provide return addresses. It would be particularly advantageous if the method could allows native address prediction hardware to function more effectively, thereby improving performance.

Figure 2:
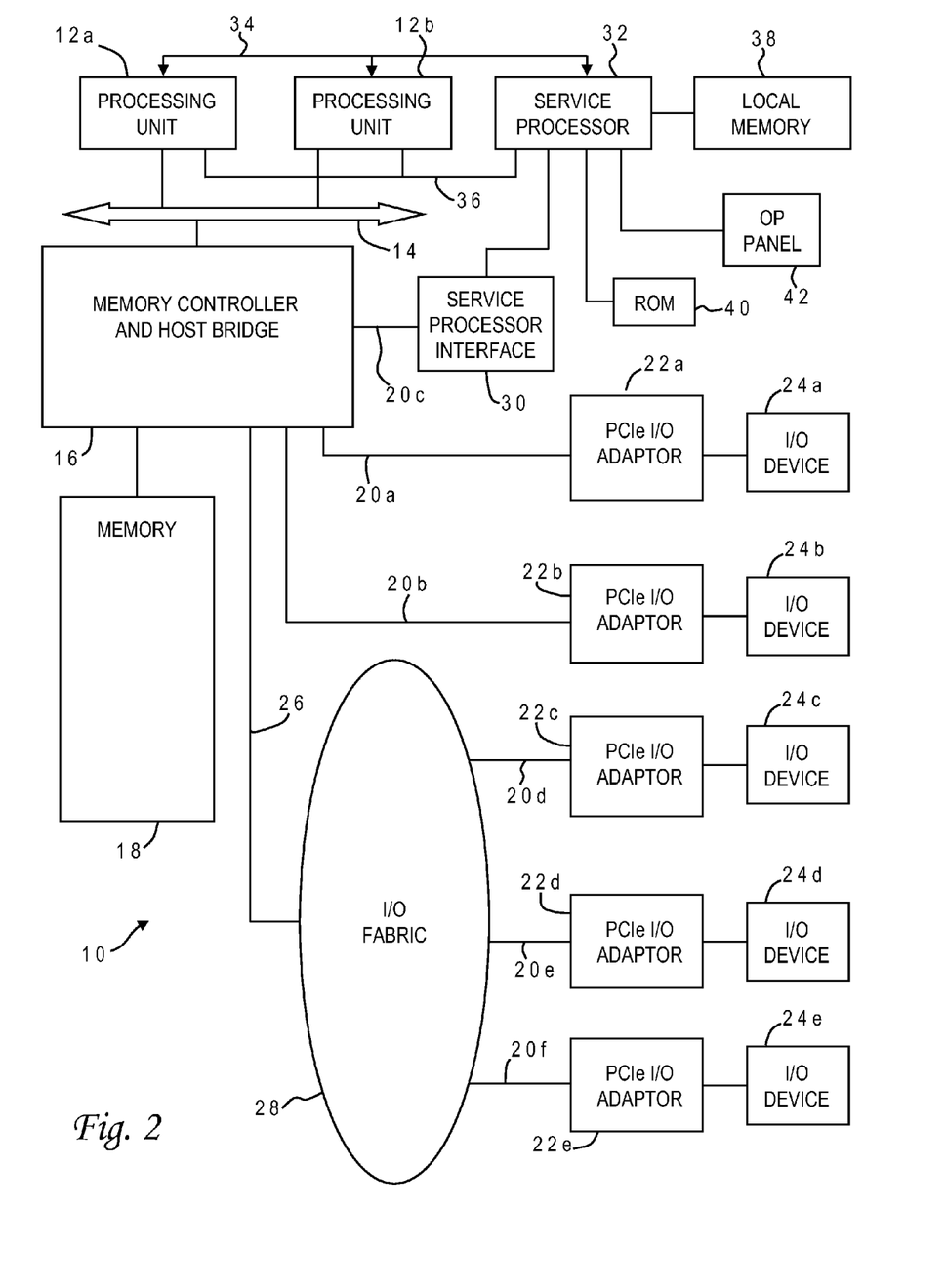
FIG. 2 is a block diagram of a computer system programmed to carry out dynamic code translation in accordance with one implementation of the present invention.

With reference now to the figures, and in particular with reference to FIG. 2, there is depicted one embodiment 10 of a computer system in which the present invention may be implemented to carry out the dynamic binary translation of a subject software application. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications, and in particular the dynamic code translator of the present invention which may reside on the hard disk drive, a DVD, or other computer readable storage medium. While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Unless otherwise explicitly indicated, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a dynamic code translation process that uses novel isostate tracking to optimize return addresses. Accordingly, a program embodying the invention may include conventional aspects of various DBT tools, and these details will become apparent to those skilled in the art upon reference to this disclosure.

Figure 3:
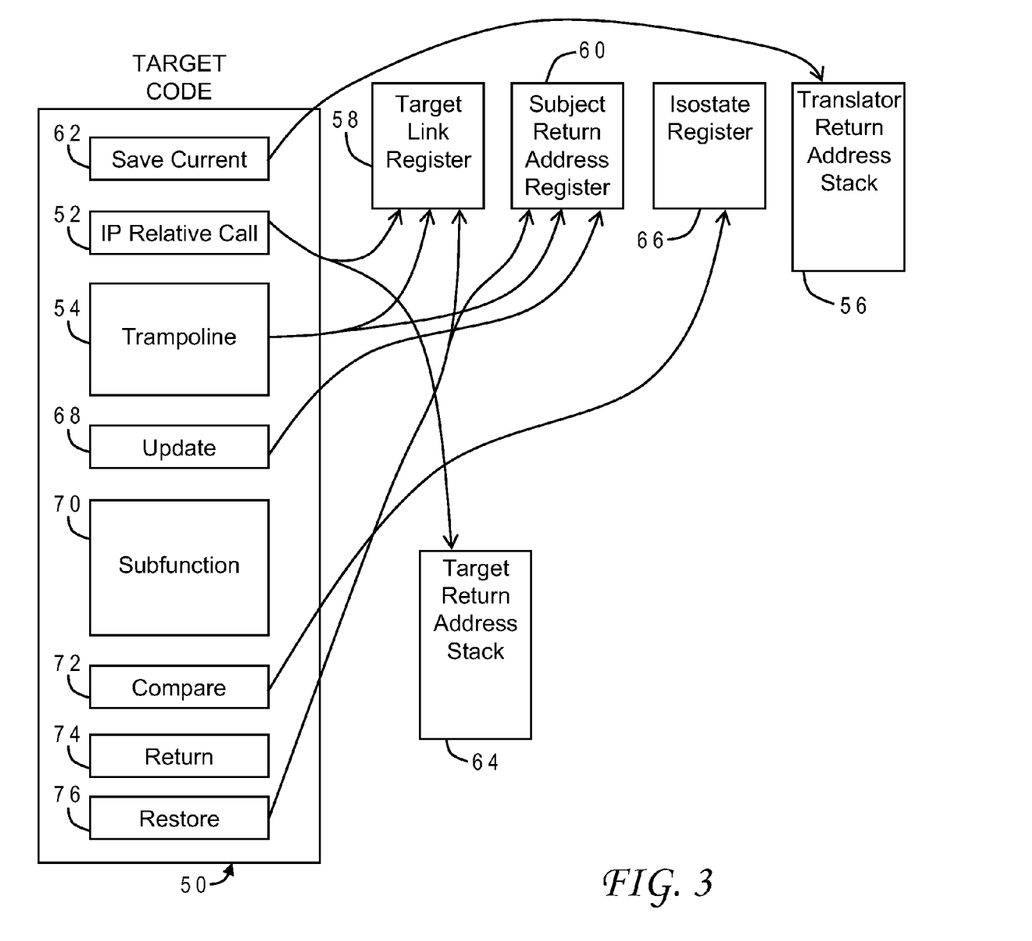
FIG. 3 is a pictorial representation of a target code sequence created by the translator in accordance with one implementation of the present invention, and its interaction with various registers and stacks.

There are three regions of subject code that are of particular interest to the present invention: the subject call which passes control into a subfunction; the subject return at the end of a subfunction which is supposed to return back to the address directly following the call; and the actual address directly after the call (the return destination). Different pieces of code can be planted in the target code sequence (i.e., the translated code executed by the target machine) as each of these regions is encountered and translated. FIG. 3 illustrates an example of such a target code sequence 50 constructed in accordance with the present invention as part of a dynamic binary translation process. During the translation of a subject call, a native call instruction 52 can be planted over a small area of code referred to as a trampoline 54. This allows the hardware to predict that the address of a future return will be the address of trampoline 54. This address, along with the subject return address (which is known statically at translate time) can additionally be saved on a software stack, referred to herein as the translator return address stack 56. Each entry in that stack thus constitutes a subject address-target address pair the program is expected to return to. Translator return address stack 56 is last-in, first-out (LIFO). The invention further uses a target link register 58 to store the current target address, and a subject return address register 60 for recording the most recent subject address that corresponds to the target address currently in the target link register.

At the point a subject call is first encountered, save current code 62 can be planted in the translated code to take the existing values from target link register 58 and subject return address register 60, and save them in translator return address stack 56. The native call instruction 52 is then planted to move execution forward a small number of target instructions, over trampoline 54. Call 52 is an unconditional, instruction pointer (IP) relative target call. IP relative addressing uses a displacement value and an instruction pointer as address operands, as opposed to displacement-only addressing. In this case the displacement is +4 for the trampoline address. This call has two implicit side-effects: the address of the return trampoline is placed in target link register 58, and the same address is additionally pushed onto the head of a LIFO target return address stack 64. Target return address stack 64 is a hardware feature used by the target machine to predict the destination of future return instructions, and is architecture specific. Target return address stack 64 allows the architecture to start fetching instructions from the return site and thereby avoid pipeline stalls. The present invention takes advantage of this type of hardware optimization by using the IP relative call directly before the trampoline, which causes the target hardware to predict the return to that trampoline and so perform efficiently. The translator may further utilize a subject stack which is an emulation of the true subject machine return address stack. In most architectures, each frame on this stack will contain a true subject return address, which might be manipulated by the subject program itself.

Trampoline 54 restores target link register 58 and subject return address register 60 by taking the values from translator return address stack 56. Trampoline 54 is thereafter populated with conditional relative branches for each known translated isoblock for this subject address. Each branch is conditioned on an integer value representing an entry isostate of each block, encoded during translation as described further below. The static isostate values in trampoline 54 can be compared to an isostate value in a dynamic register 66 to determine the appropriate address for the corresponding block. Control then jumps to that block. Any block could potentially start at the subject address of one or more existing trampolines. Trampoline 54 can reserve code area for as many compare/branch pairs as there are possible isostate encodings (initially filled with no-ops). Trampoline 54 can also include recovery code to find the next block in case no matching isostate is found (such as the QuickTransit targetCodeAddComputedSuccessor command).

Immediately after the call (in the code region directly after the end of trampoline 54), update code 68 can be planted to update subject return address register 60 to contain the subject address directly after the call. Control then passes to the target subfunction 70 corresponding to the subject function call.

When translating a return, comparison code 72 is planted in target code sequence 50 to compare the saved subject return address from subject return address register 60 with the computed subject return address (often a value on the subject stack, depending on the subject architecture). If they are equal, the exit isostate of the return block is written into isostate register 66, and control returns to the address of trampoline 54. Since the address of trampoline 54 is expected by the hardware prediction logic, this return will be very low cost. A target return instruction 74 is then planted to jump to the address in target link register 58 (which will return control back to trampoline 54 directly following the previously executed call). If the comparison does not match, the translator plants restore code 76 for traversing a computed jump as normal. In order to keep translator return address stack 56 in synchronization, a pair of values are taken off it, restoring them to target link register 58 and subject return address register 60.

Isostate register 66 can be inside the target code but should remain outside of target code for any specific block. It can for example be a non-fix-mapped target register (software). In the preferred implementation of the invention there are a relatively small number of isostate encodings, for example, 16. The invention is able to accommodate such a small number because of certain likely behaviors of isostates. Many isostate flags are extremely static, such as whether a floating point unit is active, or whether the translator is currently executing 16-bit code. For a given run of an application, they will either be asserted or not, and this state will almost never change. Most other isostate flags are extremely dynamic. A few isostate flags, such as compare flags, change so often that they are overwritten by almost every block, without the previous value being used. Therefore, the state of these flags from a previous block is irrelevant as they will never be used. Very few flags land in between these two extremes, so the result is only a few different isostates at runtime. The invention can further use the concept of a "don't care" state—a mask of isostate flags that are overwritten within the block without their previous values being used. If the values of the extremely dynamic flags are masked out, and a global list of distinct masked values is maintained, the translator can successively encode each isostate as it is encountered with a value between 0 and n−1, where n is the number of isostates available. In the unlikely event that this table is filled, the optimization is no longer applied to blocks with different masked isostates. This approach allows the translator to cover almost all blocks whilst keeping the number of distinct isostate encodings very small.

Figure 4:
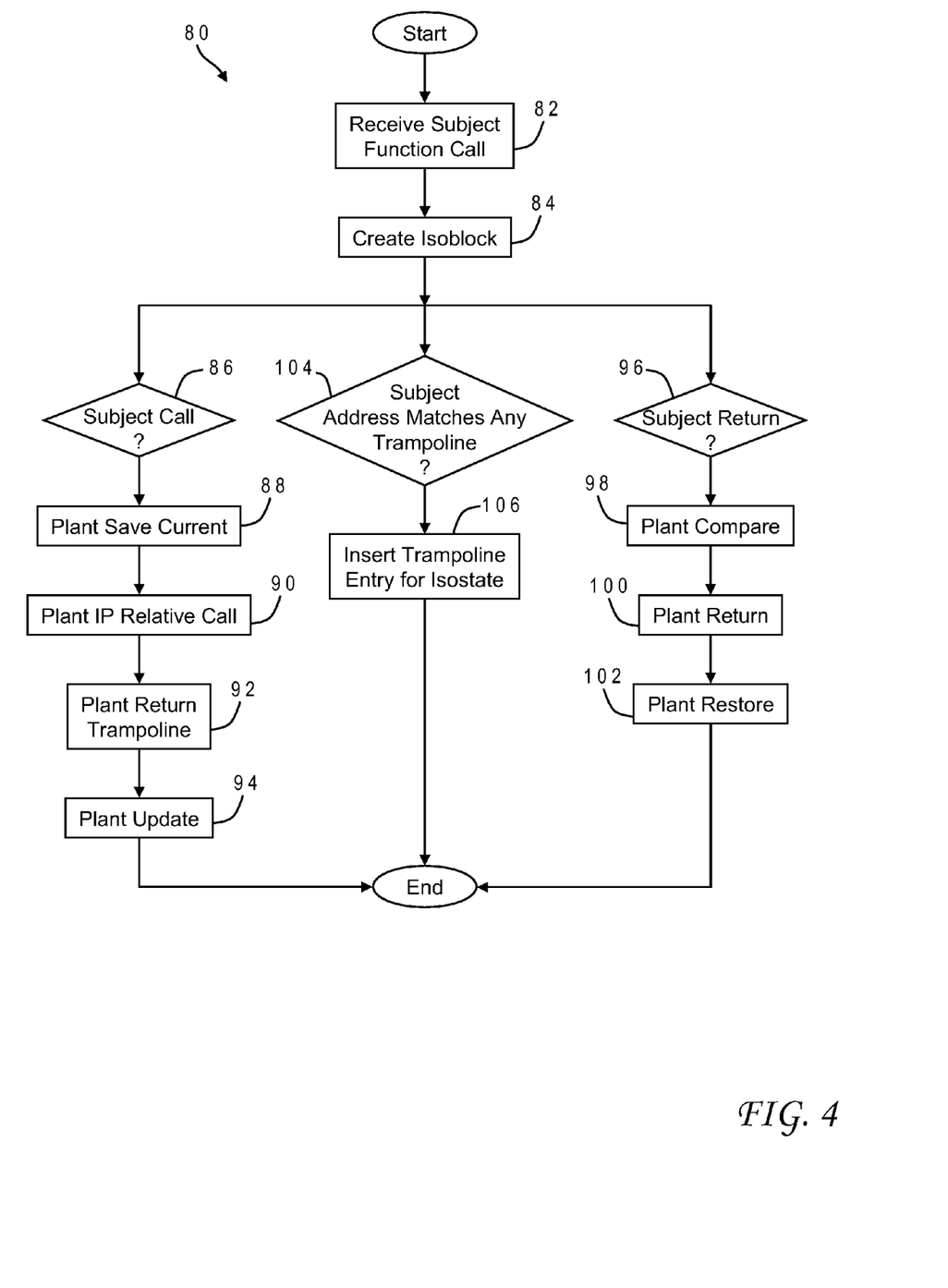
FIG. 4 is a chart illustrating the logical flow for a dynamic binary translation process in accordance with one implementation of the present invention wherein three different procedures can be used to plant instructions in the target code sequence during execution of the subject program.

The present invention may be further understood with reference to the chart of FIG. 4 which illustrates the logical flow for a dynamic binary translation process 80 in accordance with one implementation of the present invention wherein three different procedures can be used to plant instructions in the target code sequence during execution of the subject program. The process begins when the translator receives a subjection function call 82 which is to be executed in the native environment. The translator creates an isoblock for the function call 84. Different code can then be translated depending on the order of execution in the subject program. If a subject call occurs 86, the translator will plant the save current code 88, plant the IP relative call 90, plant the return trampoline 92 including population of a branch, and plant the subject return address update 94. If a subject return occurs 96 (presumably the subfunction has been translated before the return), the translator will plant the compare code 98, plant the return code 100, and plant the restore code 102. For any block whose subject address matches the subject address of any trampoline 104, a branch entry is inserted in the trampoline for the current isostate 106. This entry will cause execution to jump to the target code for this block when the isostate register matches this isostate. Once created, the isoblock can be cached for future repeated use.

Figure 5:
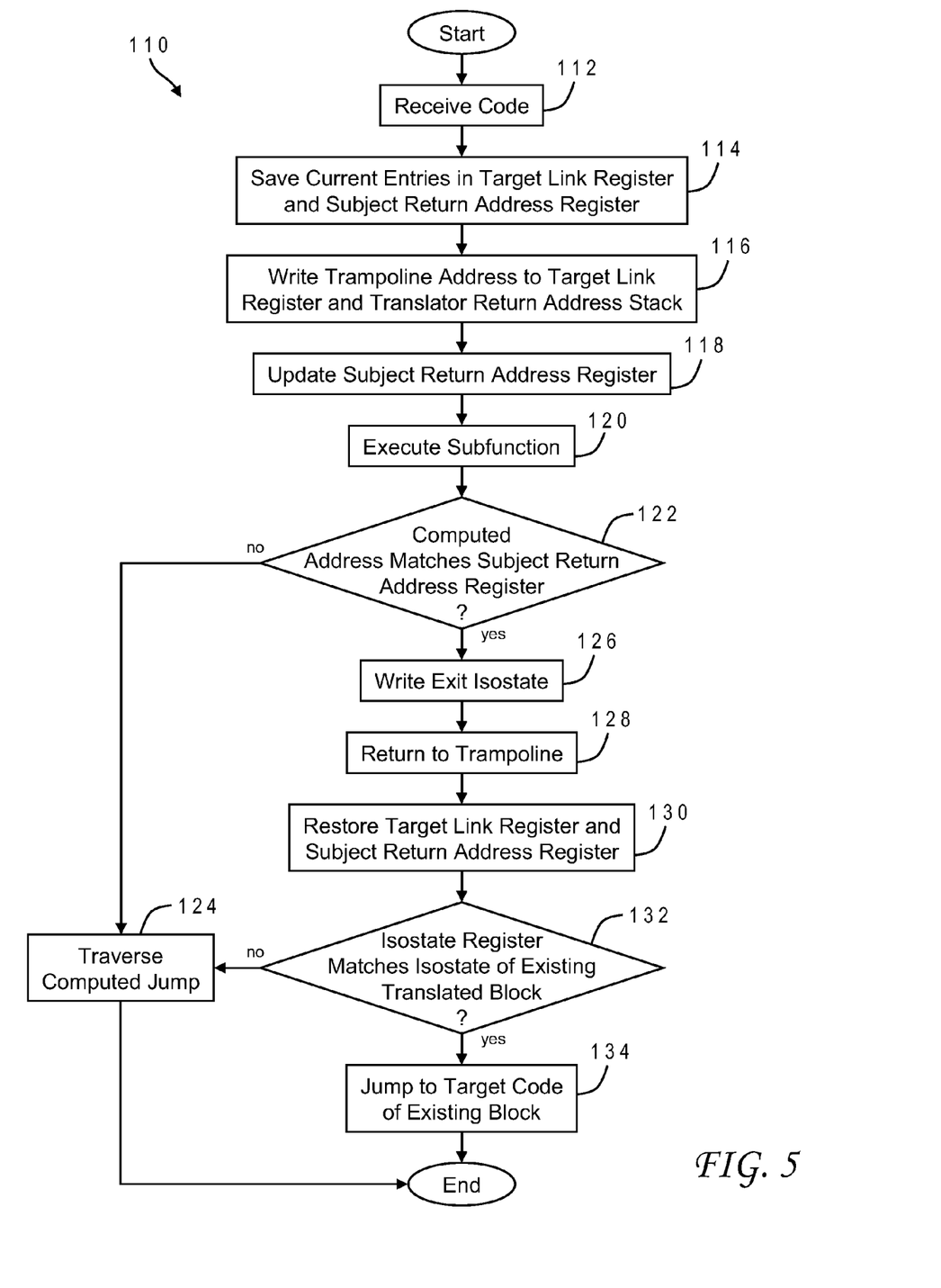
FIG. 5 is a chart illustrating the logical flow for execution of the translated code, including planted instructions, by a target machine in accordance with one implementation of the present invention.

FIG. 5 illustrates a chart of the logical flow for an execution process 110 of the translated code, including planted instructions, by a target machine according to the foregoing implementation. The process begins when the target machine receives the translated code 114. Current entries in the target link register and subject return address register are saved to the translator return address stack 114. In response to the IP relative call, the trampoline address is written to the target link register and target return address stack 116. The subject return address register is then updated 118 and the subfunction is executed 120. A check is made to see if the computed return address matches the value in the subject return address register 122. If the values do not match, the target machine traverses a computed jump according to conventional rules 124. If the values match, the target machine writes the exit isostate to the isostate register 126 and returns to the trampoline 128. The target link register and subject return address register are restored using the translator return address stack 130. The target code then checks the value in the isostate register against the isostate of an existing translated block 132. If the isostate register does not match any previous block, the target machine again traverses a computed jump according to conventional rules 124. If the isostate register does match an early block, the target machine jumps to the target code for the existing block 134.

By separating the identification of the subject return address and the isoblock state, the present invention allows the native address prediction hardware to function effectively, thereby improving performance. A translator constructed in accordance with the present invention replaces a very slow indirect branch with a quick return, compare, and IP relative branch, which are much more efficient.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of optimizing return address translation in a dynamic code translator comprising:
   receiving a function call from subject code designed for a first machine having a first hardware environment;
   compiling an isoblock including at least target code and compatibility information wherein the target code is designed for a second machine having a second hardware environment which is different from the first hardware environment and the target code includes a subfunction corresponding to the function call;
   planting in the target code a trampoline instruction set having a plurality of branch instructions which return a true subject return address conditioned on an isostate of the isoblock stored in an isostate register; and
   inserting in the target code instructions which write an address of the trampoline instruction set to a target return address stack of the second machine, instructions which write an address from the subject code directly following the function call to a subject return address register, and instructions which write the isostate of the isoblock to the isostate register when a computed subject return address matches an entry in the subject return address register.

2. The method of claim 1 wherein the instructions which write the address of the trampoline instruction set to the target return address stack include an IP relative target call.

3. The method of claim 2 wherein:
   the IP relative target call also writes the address of the trampoline instruction set to a target link register; and
   said inserting further inserts instructions which save an existing target return address from the target link register and an existing subject return address from a subject return address register in a translator return address stack, prior to writing the address of the trampoline instruction set to the target link register.

4. The method of claim 1 wherein the isostate register is a non-fix-mapped target register.

5. The method of claim 1 wherein the trampoline instruction set further includes recovery code to find a successor block when the isostate in the isostate register does not match an isostate for any of the branch instructions.

6. The method of claim 1 wherein said planting reserves code area in the trampoline instruction set for a number of compare/branch pairs which is equal to a number of available isostates.

7. The method of claim 1, further comprising passing the target code including the inserted instructions and trampoline instruction set to the second machine for execution.

8. A computer system comprising:
a first hardware environment including one or more processors which process program instructions and a memory device connected to said one or more processors; and
a dynamic code translator residing in said memory device which optimizes return address translation by receiving a function call from subject code designed for a different computer system having a second hardware environment which is different from the first hardware environment, compiling an isoblock including at least target code and compatibility information wherein the target code is designed for the first hardware environment and includes a subfunction corresponding to the function call, planting in the target code a trampoline instruction set having a plurality of branch instructions which return a true subject return address conditioned on an isostate of the isoblock stored in an isostate register, and inserting in the target code instructions which write an address of the trampoline instruction set to a target return address stack of the second machine, instructions which write an address from the subject code directly following the function call to a subject return address register, and instructions which write the isostate of the isoblock to the isostate register when a computed subject return address matches an entry in the subject return address register.

9. The computer system of claim 8 wherein the instructions which write the address of the trampoline instruction set to the target return address stack include an IP relative target call.

10. The computer system of claim 9 wherein:
the IP relative target call also writes the address of the trampoline instruction set to a target link register; and
said dynamic code translator further inserts instructions in the target code which save an existing target return address from the target link register and an existing subject return address from a subject return address register in a translator return address stack, prior to writing the address of the trampoline instruction set to the target link register.

11. The computer system of claim 8 wherein the isostate register is a non-fix-mapped target register.

12. The computer system of claim 8 wherein the trampoline instruction set further includes recovery code to find a successor block when the isostate in the isostate register does not match an isostate for any of the branch instructions.

13. The computer system of claim 8 wherein said dynamic code translator further reserves code area in the trampoline instruction set for a number of compare/branch pairs which is equal to a number of available isostates.

14. The computer system of claim 8 wherein said dynamic code translator further passes the target code including the inserted instructions and trampoline instruction set to the first hardware environment for execution.

15. A computer program product comprising:
a computer-readable storage medium; and
a dynamic code translator residing in said storage medium which optimizes return address translation by receiving a function call from subject code designed for a first computer system having a first hardware environment, compiling an isoblock including at least target code and compatibility information wherein the target code is designed for a second computer system having a second hardware environment which is different from the first hardware environment and the target code includes a subfunction corresponding to the function call, planting in the target code a trampoline instruction set having a plurality of branch instructions which return a true subject return address conditioned on an isostate of the isoblock stored in an isostate register, and inserting in the target code instructions which write an address of the trampoline instruction set to a target return address stack of the second computer system, instructions which write an address from the subject code directly following the function call to a subject return address register, and instructions which write the isostate of the isoblock to the isostate register when a computed subject return address matches an entry in the subject return address register.

16. The computer program product of claim 15 wherein the instructions which write the address of the trampoline instruction set to the target return address stack include an IP relative target call.

17. The computer program product of claim 16 wherein:
the IP relative target call also writes the address of the trampoline instruction set to a target link register; and
said dynamic code translator further inserts instructions in the target code which save an existing target return address from the target link register and an existing subject return address from a subject return address register in a translator return address stack, prior to writing the address of the trampoline instruction set to the target link register.

18. The computer program product of claim 15 wherein the isostate register is a non-fix-mapped target register.

19. The computer program product of claim 15 wherein the trampoline instruction set further includes recovery code to find a successor block when the isostate in the isostate register does not match an isostate for any of the branch instructions.

20. The computer program product of claim 15 wherein said dynamic code translator further reserves code area in the trampoline instruction set for a number of compare/branch pairs which is equal to a number of available isostates.

21. The computer program product of claim 15 wherein said dynamic code translator further passes the target code including the inserted instructions and trampoline instruction set to the second computer system for execution.

* * * * *